A. F. PRIEST.
SPRING WHEEL FOR VEHICLES.
APPLICATION FILED MAY 19, 1910.
1,022,754.
Patented Apr. 9, 1912.
2 SHEETS—SHEET 1.
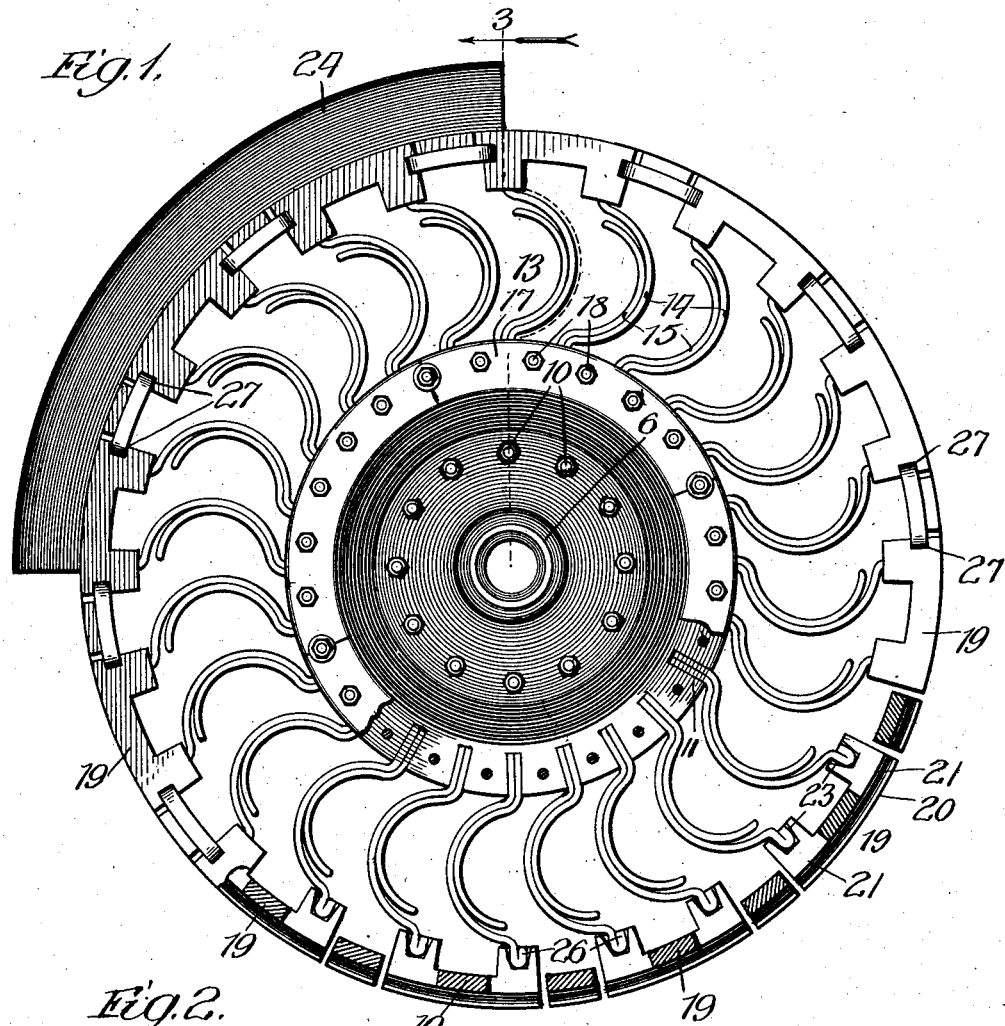
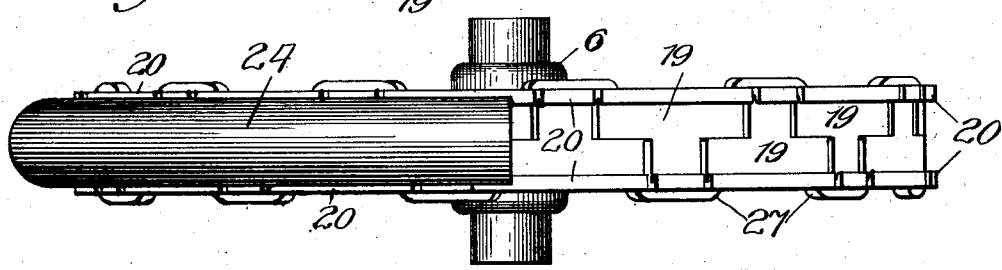
Witnesses:
Inventor:
Augustus F. Priest,
By Dyrenforth, Lee, Chritton & Wiles,
Attys.

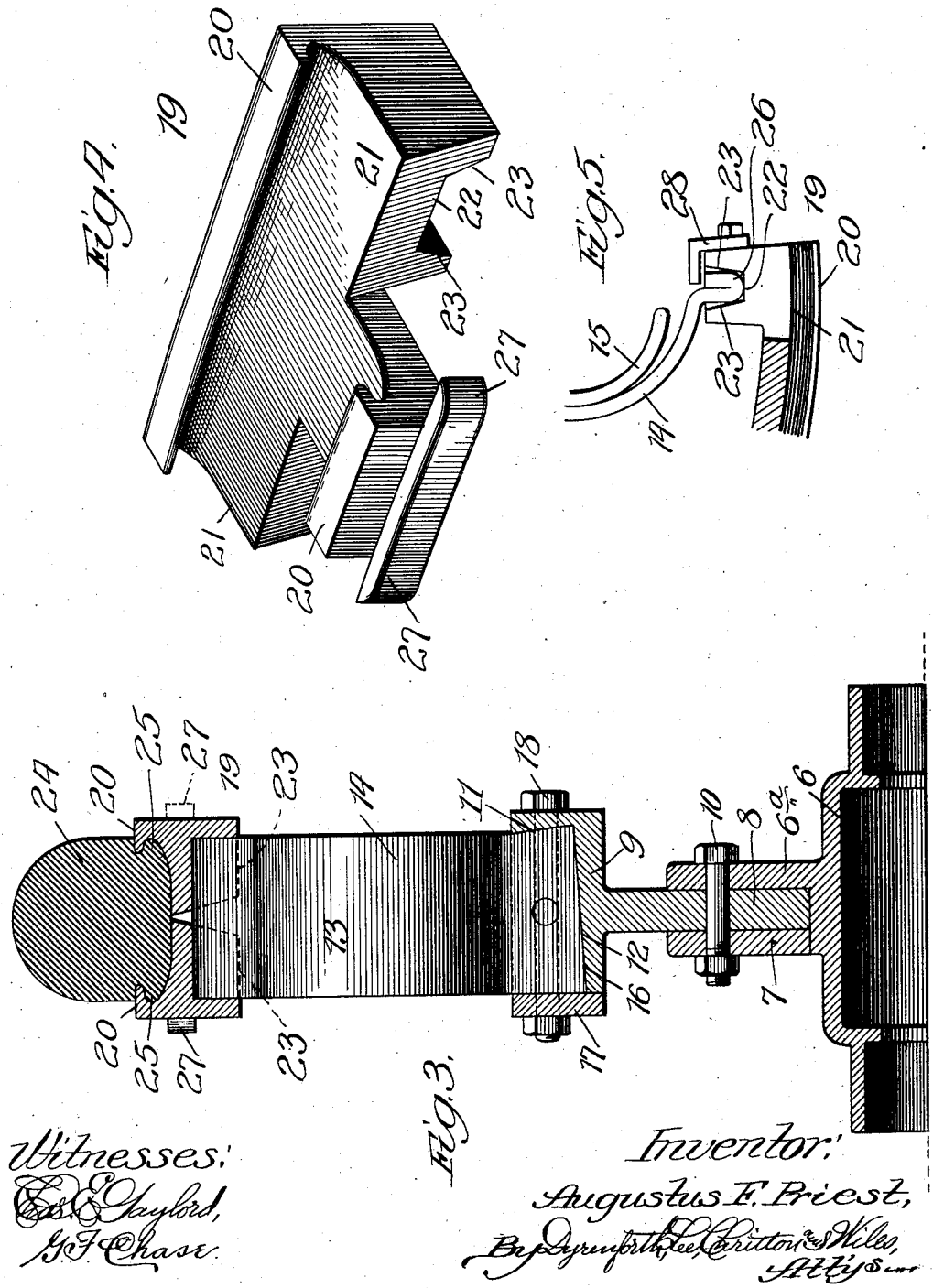

UNITED STATES PATENT OFFICE.

AUGUSTUS F. PRIEST, OF CHICAGO, ILLINOIS.

SPRING-WHEEL FOR VEHICLES.

1,022,754.   Specification of Letters Patent.   Patented Apr. 9, 1912.

Application filed May 19, 1910. Serial No. 562,119.

*To all whom it may concern:*

Be it known that I, AUGUSTUS F. PRIEST, a citizen of the United States, residing at Chicago, in the county of Cook and State of Illinois, have invented a new and useful Improvement in Spring-Wheels for Vehicles, of which the following is a specification.

My object is to provide a novel construction of vehicle wheel of the type employing springs for supporting the rim on the hub which will afford, in its use on a vehicle, the desired resiliency for absorbing shocks and vibrations produced by traveling over rough roads.

My invention is illustrated in the accompanying drawings, in which—

Figure 1 is a view in elevation of a wheel partly in section constructed in accordance with my invention, a portion of the tire being omitted. Fig. 2 is an edge view of the wheel viewing it from the top of Fig. 1. Fig. 3 is a section taken at the line 3 on Fig. 1 and viewed in the direction of the arrow. Fig. 4 is a perspective view of one of the plurality of similar sections forming the wheel-rim; and Fig. 5, a view in side elevation of one of the rim-sections and coöperating spring showing means for preventing disconnection of the spring from the rim-sections.

The hub of the wheel which is like that usually employed in wheels for automobiles, is represented at 6, and is formed with an annular flange 6ª between which and an annular disk 7 the web 8 of a peripherally flanged ring 9 is held, as by bolts 10. The flanged portion of the ring 9 contains radially disposed recesses 11 spaced apart equidistantly and opening through one side of the ring as illustrated in Fig. 3, the bottom surfaces of the recesses 11 inclining downwardly toward their lateral open ends, as represented at 12. Fitting at their inner ends in the recesses 11 to extend radially of the axis upon which the wheel rotates, are leaf-springs 13 each formed of a main member 14 and a supplemental or reinforcing member 15, the latter being of slightly less length than the member 14. The springs 13 are beveled on their inner ends, as indicated at 16, and are held in the ring 9 against lateral displacement therein by an annular plate 17 which fits against the sides of the spring 13 and the unflanged side of the ring 9 and is held in place by bolts 18.

The rim of the wheel is formed of relatively movable sections 19, each of which is substantially T-shape in plan, having its outer longitudinally convexed surface provided with undercut tire-engaging flanges 20 at opposite edges. Each section 19 is arranged in reverse order with relation to those adjacent to it, whereby these sections are caused to laterally overlap each other at their T-heads, as illustrated in Fig. 2. Each section 19 contains on its inner surface, in the end portions 21 of its T-head inwardly opening recesses 22, the walls of which are inclined as represented at 23 in Figs. 3 and 4, the recesses 22 of adjacent sections 19 opening toward each other and combining to afford a socket of a width approximately equal to that of the outer ends of the spring-members 14 which seat therein.

The sections 19 laterally overlapping each other as described afford, by reason of the provision of the undercut flanges 20, the means for confining an endless tire, such as that represented at 24, to the rim, the tire which may be of the solid or cushion type, being provided with annular beads 25 at its opposite sides for fitting under and interlocking with the undercut flanges 20 on the rim, as illustrated in Fig. 3.

The parts of the wheel may be assembled in the following manner: The sections 19 of the rim may be first applied to the tire 24 in the overlapping condition illustrated with their flanges 20 interlocking with the beads 25 on the tire. The outer ends of the spring-members 14, which are preferably bent upon themselves as illustrated at 26 to present curved bearing-surfaces, are then introduced into the sockets formed by the coöperating recesses 22, to cause the shorter edges of the springs to be uppermost, whereupon the ring 9 is applied to the springs 13 to cause the inner ends of the latter to enter the recesses 11 laterally of the wheel from their open sides, and the disk 17 there positioned on the ring 9 and the parts just described moved into the positions illustrated in Fig. 3 by tightening the nuts on the bolts 18, the inclined surfaces 16 of the springs 13 in this operation riding upon the oppositely-inclined bottom-surfaces 12 of the recesses 11 and operating to place the springs 13 under the desired tension. The spring-members 15, which, by preference, are not assembled under tension with the other parts of the wheel, are preferably inserted into the recesses 11 with the members 14, the members 15 lying against the concaved surfaces of the members 14 with which they coöperate, but spaced therefrom slightly at their outer extremities, as illustrated in Fig. 1, for a purpose hereinafter explained.

The rim-sections 19 by reason of the radial pressure exerted against them by the springs thus tend to spread apart, this tendency being resisted by the tire 24 which is thus maintained firmly interlocked with the rim-sections.

It will be noted from the foregoing that each section 19, which is free to move radially independently of the others, is backed up by two of the springs 13 operating against their end-portions, and that each spring 13 works against two adjoining sections 19, whereby abrupt discontinuance of the action of any spring is avoided and uniform resiliency in the wheel is produced throughout its revolutions when traveling over a road, the springs serving to absorb locally the shocks imparted to them, and thus produce an action similar to that effected by a pneumatic tire.

It is preferred that the sections 19 be so proportioned with relation to the tire 24, as to cause them to be spaced apart a slight distance both longitudinally and transversely, as represented in Figs. 2 and 3, and that each section be provided with guide-lugs 27 which extend on opposite sides of the bar-portions of the sections 19 and overlap the end portions 21 of the T-heads of adjacent sections, whereby any tendency to lateral displacement of the sections 19, when the wheel is in action, will be resisted not only by the tire 24 but by the sections 19 adjacent to the one subjected to such laterally-operating force, it being desired that the guide-lugs 27 be normally out of contact with the adjacent sections 19 with which they coöperate.

As hereinbefore stated, it is preferred that each spring 13 be formed of a member 14 normally under tension and non-tensioned supplemental spring-member 15, the tension of the spring-members 14 and their arrangement and that of the members 15 being such that when the weight carried by the wheel is directed against the sections 19 intermediate their ends, such weight is borne by two of the springs 13 and preferably by the two members 14 only of such springs, whereas when the weight is directed against the ends of the T-heads of the sections 19, the weight is borne mainly by but one of the springs 13, thus compressing the spring-member 14 to a degree sufficient to cause the coöperating member 15 to be brought into operation and flexed against its inherent tension. It will thus be manifest that by the spring-construction above described the yielding action of the sections 19 may be caused to be approximately uniform irrespective of the points on the sections 19 against which the weight on the wheel is directed, and thus uniform resiliency in the wheel is afforded.

In Fig. 5 I have shown means coöperating with the springs 13 for preventing them from becoming disengaged from the rim-sections the use of which may be desirable under some conditions. These means comprise angle-shaped brackets 28 bolted to each of the heads 21 and overlapping, at their outer ends, the outer deflected ends of the spring-members 14, but out of contact therewith.

While I have illustrated and described a particular embodiment of my invention, I do not wish to be understood as intending to limit it to such embodiment, as it may take various other forms without departing from the spirit thereof.

What I claim as new and desire to secure by Letters Patent is—

1. In a spring-wheel, the combination of its hub-portion, a rim formed of a circumferential series of laterally-overlapping relatively-movable sections, springs interposed between the rim and hub and bearing against said rim-sections, a continuous tire confined about said rim, and lugs on said rim-sections overlapping the sides of adjacent rim-sections, for the purpose set forth.

2. In a vehicle-wheel, the combination with a hub-portion, a rim formed of a circumferential series of relatively-movable disconnected laterally-overlapping non-radially guided sections, a continuous tire confined about said rim, and bow-shaped springs engaging with said hub and with said rim-sections, each of said springs bearing at its outer end against mutually overlapping portions of said sections, and the bowed sections thereof extending in the same direction, whereby the rim-sections are capable of movement circumferentially of said hub.

3. In a spring-wheel, a spring-supported rim comprising a circumferential series of relatively-movable laterally-overlapping sections formed with recesses on their inner surfaces the recesses of adjacent sections opposing and opening into each other and into which the springs of the wheel extend, and a tire confined about the rim.

AUGUSTUS F. PRIEST.

In presence of—
R. A. SCHAEFER,
JOHN WILSON.

---

Copies of this patent may be obtained for five cents each, by addressing the "Commissioner of Patents, Washington, D. C."